April 26, 1932.    S. NEDBOR    1,855,888
HOSE NOZZLE
Filed April 16, 1931
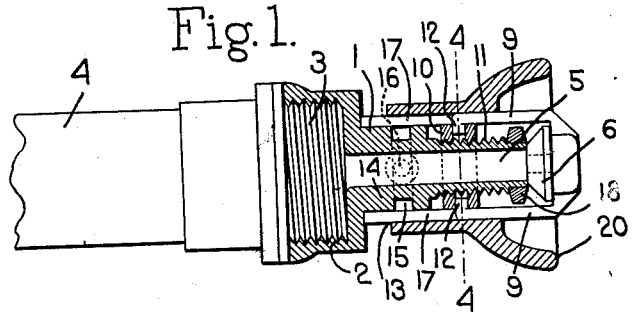
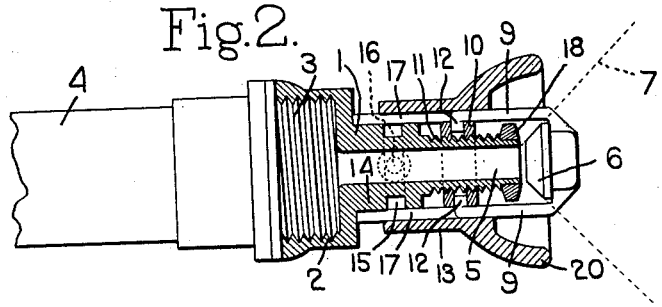
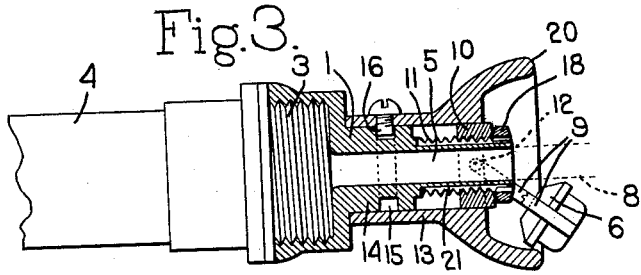
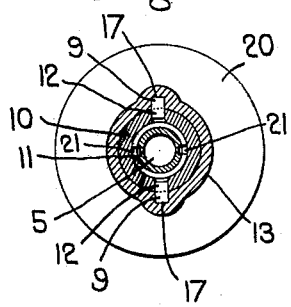 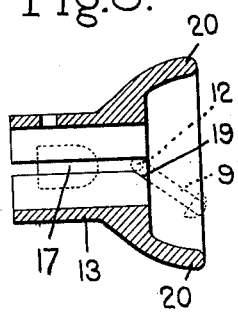 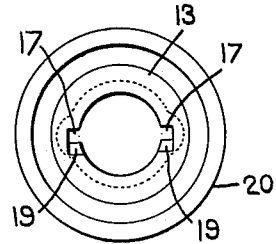
Inventor.
Samuel Nedbor
by Heard Smith & Tennant.
Attys.

Patented Apr. 26, 1932

1,855,888

UNITED STATES PATENT OFFICE

SAMUEL NEDBOR, OF DORCHESTER, MASSACHUSETTS

HOSE NOZZLE

Application filed April 16, 1931. Serial No. 530,522.

This invention relates to hose nozzles and has for its object to provide a novel nozzle which can be easily adjusted to throw either a solid stream or a spray.

In order to give an understanding of the invention I have illustrated in the drawings a selected embodiment thereof which will now be described after which the novel features will be pointed out in the appended claims.

Fig. 1 is a sectional view through a nozzle embodying my invention showing the combined valve and spray member adjusted to close the nozzle;

Fig. 2 shows the parts adjusted to deliver water in the form of a spray;

Fig. 3 shows the parts adjusted to deliver a solid stream;

Fig. 4 is a section on the line 4—4, Fig. 1;

Fig. 5 is a sectional view through the sleeve which controls the adjustment of the nozzle;

Fig. 6 is an end view of the sleeve.

My improved hose nozzle comprises a nozzle member 1 which is provided at one end with the usual interiorly screw-threaded recess 2 adapted to be screw threaded to the screw-threaded connection 3 of a hose 4. This nozzle member 1 is provided with the axial duct 5 through which the water is discharged. Co-operating with the nozzle member 1 is a combined valve and spray device 6. This is in the form of the frustrum of a cone and is adjustably mounted on the nozzle member so that in one position it constitutes a valve which closes the end of the duct 5 as shown in Fig. 1 thereby shutting off the delivery of water and in another position it is separated slightly from the end of the duct as shown in Fig. 2 and in this position will produce a spray as shown by the dotted lines 7. In still another adjusted position the combined valve and spray device occupies a position entirely to one side of the duct 5 as shown in Fig. 3 so that the nozzle will deliver a solid stream of water as indicated by the dotted lines 8.

This valve and spray device 6 is provided with two arms 9 which are pivotally connected to a nut member 10 that is screw threaded on the screw-threaded portion 11 of the nozzle member. As herein shown the ends of the arms 9 are bent inwardly as indicated at 12 and these inwardly-bent ends enter openings or recesses formed in the side of the nut member 10. The adjustment of the combined valve and spray device 6 is accomplished by turning the nut 10 on the screw-threaded portion 11 of the nozzle.

To accomplish this I have provided an actuating sleeve 13 which fits around the cylindrical portion 14 of the nozzle member and which is turnable thereabout. As herein shown this portion 14 of the nozzle is provided with an annular groove 15 and the sleeve member 13 carries a screw 16 which enters the groove 15. This permits the sleeve to be freely rotated on the nozzle member but prevents its moving longitudinally thereof. The nut member 10 has a cylindrical exterior surface which fits the bore of the sleeve member 13. This sleeve member 13 is provided with two grooves 17 in which the arms 9 are received. By this means the sleeve and the nut 10 are locked together for rotative movement while the nut is permitted to move longitudinally of the sleeve. This turning of the sleeve 13 on the nozzle member will turn the nut member 10 thereby moving the nut member along the screw-threaded portion 11. The turning of the sleeve in one direction will cause the nut member 10 to move to the left or away from the end of the nozzle member while the turning of the sleeve in the other direction will cause the nut member to move to the right or toward the end of the nozzle member.

When the sleeve is turned in a direction to move the nut toward the right the combined valve and spray member will be seated against the end of the nozzle as shown in Fig. 1 thereby shutting off the nozzle. If the sleeve is adjusted so as to place the combined valve and spray member in substantially the position shown in Fig. 2 then the nozzle will be adjusted to deliver a spray 7. The water issuing from the duct 5 will engage the nozzle member and will be deflected by the conical face thereof into the form of a spray.

The character of the spray can be varied by adjusting the combined valve and spray device 6 further from or nearer to the end of the nozzle. When in this intermediate position the valve and spray device is held properly centered relative to the duct 5 by the arms 9 which are retained in the grooves 17. When the sleeve is turned to advance the nut member 10 to the limit of its movement to the right or toward the end of the nozzle as shown in Fig. 3 then the arms 9 are carried out of the grooves and the combined valve and spray member is allowed to swing laterally with reference to the axis of the nozzle into a position out of line with the duct 5 as shown best in Fig. 3. When in this position there will be no obstruction to the water being ejected from the duct 5 and a solid stream 8 will be delivered.

The nozzle member is shown as having a stop collar 18 at its end which limits the travel of the nut member 10 toward the right. If desired, the sleeve 13 may be cut away at the outer end of the groove 17 as shown at 19 so that when the nut has been carried to the end of its travel to the right the combined valve and spray member will be free to tilt into the inoperative position shown in Fig. 3. If the nozzle is held horizontally and the cut-away portion 19 is on the lower side of the groove then the valve and spray member will automatically assume their inoperative position when the nut member 10 reaches the right hand limit of its movement.

The sleeve 13 is shown as having a guard flange 20 which assists in controlling the form of the spray by preventing any water from being thrown backwardly or in a direction at right angles to the axis when the combined valve and spray device is in its intermediate position as shown in Fig. 2. This flange also provides a guard flange for the combined valve and spray member to prevent it from being injured and further forms a rest for said member when it is in its inoperative position as shown in Fig. 3.

21 indicates clearance grooves formed in the screw-threaded portion 11 of the nozzle member. These grooves are to provide a space to receive sand, dirt, etc. which might accumulate in the nozzle as it is used and the presence of which would interfere with the free rotation of the nut 10 on the screw-threaded portion 11. Any sand which accumulates within the sleeve will be crowded into the clearance grooves 21 by rotation of the nut 10 thereby preventing the nut from becoming clogged.

The nozzle is simple in construction and is inexpensive to manufacture.

I claim:

1. A hose nozzle comprising a nozzle member having a water delivery duct and an exteriorly screw-threaded portion, a nut screw threaded on said screw-threaded portion, a combined valve and spray device pivotally connected to said nut, a sleeve rotatively mounted on the nozzle member and operatively connected to the nut, whereby rotation of the sleeve will turn the nut on the screw-threaded portion of the nozzle and thereby adjust the position of the combined valve and spray device either into a position in which it closes the end of the duct or in which it is spaced slightly from the end of the duct and acts as a spray device.

2. A hose nozzle comprising a nozzle member having a screw-threaded portion, a nut screw threaded on said portion, a combined valve and spray device, arms extending therefrom which are pivotally connected to the nut, a sleeve surrounding and rotatable about said nozzle member, said sleeve having longitudinal grooves to receive said arms, whereby rotation of the sleeve will turn the nut and thus move the combined valve and spray device in an axial direction.

3. A hose nozzle comprising a nozzle member having a water-delivery duct and an exteriorly screw-threaded portion, a nut screw threaded on said portion, a combined valve and spray device, arms rigid therewith which are pivotally connected to said nut, whereby said combined valve and spray device may swing from a position in line with the duct to a position entirely one side of said line, a sleeve rotatable on the nozzle member and surrounding the nut, said sleeve having grooves to receive said arms, whereby the turning of the sleeve will rotate the nut and thereby move the combined valve and spray device from one extreme position in which it closes the duct to another extreme position in which said arms are carried out of the grooves and the valve member is permitted to swing laterally out of line with the duct.

4. A hose nozzle comprising a nozzle member having a water-delivery duct and an exteriorly screw-threaded portion, a nut screw threaded on said portion, a combined valve and spray device, arms rigid therewith which are pivotally connected to said nut, whereby said combined valve and spray device may swing from a position in line with the duct to a position entirely one side of said line, a sleeve rotatable on the nozzle member and surrounding the nut, said sleeve having grooves to receive said arms, whereby the turning of the sleeve will rotate the nut and thereby move the combined valve and spray device from one extreme position in which it closes the duct to another extreme position in which said arms are carried out of the grooves and the valve member is permitted to swing laterally out of line with the duct, said sleeve member having a guard flange which surrounds and protects the combined valve and spray member and also helps control the form of the spray.

In testimony whereof, I have signed my name to this specification.

SAMUEL NEDBOR.